United States Patent [19]

Kemper

[11] Patent Number: 4,849,463
[45] Date of Patent: Jul. 18, 1989

[54] MASKED THIOGLYCOLIC ACID ESTER STABILIZERS FOR VINYL CHLORIDE POLYMERS

[75] Inventor: Bruno Kemper, Haltern, Fed. Rep. of Germany

[73] Assignee: Huels Aktiengesellschaft, Marl, Fed. Rep. of Germany

[21] Appl. No.: 938,100

[22] Filed: Dec. 4, 1986

[30] Foreign Application Priority Data

Dec. 4, 1985 [DE] Fed. Rep. of Germany ....... 3542862

[51] Int. Cl.$^4$ .......................... C08K 5/06; C08K 5/11; C08K 5/12; C08K 5/36
[52] U.S. Cl. .................................... 524/285; 524/289; 524/302
[58] Field of Search ................ 524/303, 285, 289, 302

[56] References Cited

U.S. PATENT DOCUMENTS

| 4,111,873 | 9/1978 | Cordes III ............................ 524/82 |
| 4,125,515 | 11/1978 | Kuczkowski ....................... 524/303 |

FOREIGN PATENT DOCUMENTS

| 0022047 | 1/1981 | European Pat. Off. . |
| 111896 | 6/1984 | European Pat. Off. . |
| 0995616 | 6/1965 | United Kingdom ................ 524/303 |

OTHER PUBLICATIONS

Houben-Weyl, 9, 199–205 (1955), "Herstellung von Mercaptalen und Mercaptolen".

*Primary Examiner*—John C. Bleutge
*Assistant Examiner*—Robert E. L. Sellers II
*Attorney, Agent, or Firm*—Millen, White & Zelano

[57] ABSTRACT

Stabilized compositions containing a polymer of vinyl chloride or the like and at least one primary stabilizer and, as the costabilizer, mercaptals or monothioacetals of thioglycolic acid esters of Formula I and/or II

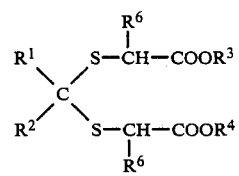

The costabilizers contained in the compositions do not exhibit any unpleasant odor, yet improve the initial color and also the total stability of the molding compositions.

11 Claims, No Drawings

MASKED THIOGLYCOLIC ACID ESTER STABILIZERS FOR VINYL CHLORIDE POLYMERS

BACKGROUND OF THE INVENTION

This invention relates to unplasticized or plasticized, stabilized compositions, especially thermoplastic compositions based on homo and copolymers of vinyl chloride and the like, and in particular to a new stabilizer system, especially a new costabilizer.

It is known that chlorine-containing polymers readily suffer degradation by the action of heat, for example during processing, leading to undesirable discolorations and impairment of mechanical properties. In order to avoid such degradation, stabilizers are thus added to the polymers prior to processing. For polyvinyl chloride and copolymers containing predominantly vinyl chloride, compounds employed as stabilizers are, in particular, organotin compounds, inorganic and organic lead salts, organic antimony compounds, or combinations of cadmium carboxylates and barium carboxylates. Frequently, costabilizers are added to these so-called primary stabilizers to improve the effectiveness of the latter. The mechanism of primary stabilizers and costabilizers has been described in the literature, for example in the publication by L. I. Nass, "Heat Stabilizers" in *Kirk-Othmer Encyclopedia of Chemical Technology*, Vol. 12: 225, 3rd ed., publishers John Wiley and Sons, 1980.

The disclosed primary stabilizers, though exhibiting adequate efficiency, include lead, antimony and cadmium compounds which, on account of their toxicity, cannot be utilized in all areas, particularly in packaging materials for foodstuffs or in the medical field. Organotin compounds, many of which are toxicologically harmless, are unsuitable for wide-range application since they are too expensive, i.e., they are difficult to obtain and/or are producible only by an expensive process.

There is thus a need for stabilizer systems comprised of components which are physiologically acceptable and which are inexpensive and/or readily accessible. One possibility is offered by the use of fatty acid salts of calcium and zinc as primary stabilizers, optionally supplemented by costabilizers, such as epoxy compounds, organic phosphites, polyhydric alcohols, or 1,3-diketones. However, the disadvantage of these stabilizing systems resides in a lack of long-term stability and/or in the unsatisfactory initial coloring of the polymer composition. Costabilizers for stabilizer systems based on zinc, which markedly improve the initial and long-term effects of primary stabilizers, are mercapto compounds, such as mercapto succinic acid diesters (EP-B No. 0 111 896 of Dec. 15, 1983/June 27, 1984) and thioglycolic acid esters (EP-B No. 0 022 047 of June 24, 1980). However, these compounds exhibit the very disadvantageous property of having an extraordinary unpleasant odor occurring during incorporation into the polymer and during storage.

SUMMARY OF THE INVENTION

It is an object of this invention to provide a stabilizer system especially for homo and copolymers of vinyl chloride, in particular copolymers predominating in vinyl chloride, which is both inexpensive and physiologically acceptable, as well as molding compositions based thereon.

It is another object of this invention to provide a stabilizer system which imparts long term stability to polymer compositions.

Another object of this invention is to provide a stabilizer system which does not give off an unpleasant odor during processing or storage.

A further object of this invention is to provide a method of stabilizing compositions, especially molding compositions, by incorporating a stabilizer system having both a primary stabilizer and a costabilizer.

Upon further study of the specification and appended claims, further objects and advantages of this invention will become apparent to those skilled in the art.

The disadvantages of the prior art have been overcome by providing stabilized compositions based on polymers of vinyl chloride which contain at least one primary stabilizer and, as the costabilizer, one or more compounds of Formula I and/or II

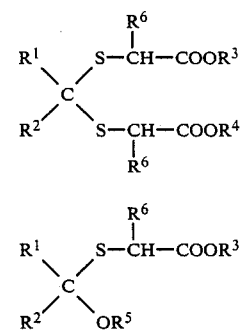

wherein $R^1$ and $R^2$, being identical or different, represent hydrogen, straight-chain or branched alkyl or alkenyl groups of 1–20 carbon atoms, or unsubstituted aryl or substituted aryl groups of 6–18 carbon atoms, or together form a cycloaliphatic ring of 5–12 carbon atoms, or either $R^1$ or $R^2$, jointly with $R^5$, is part of a heterocyclic ring with 5–9 ring atoms, $R^3$ and $R^4$, being identical or different, represent straight-chain or branched alkyl groups of 4–20 carbon atoms, preferably 6 to 12 carbon atoms. Compounds of formula I and II with alkyl groups represented by $R^3$ and $R^4$ of fewer than four carbon atoms have the disadvantage of unpleasant odor.

$R^5$ represents for a straight-chain or branched alkyl group of 1–22 carbon atoms or, jointly with $R^1$ or $R^2$, is part of a heterocyclic ring with 5–9 ring atoms, while $R^6$ represents a hydrogen atom or a grouping —CH$_2$—COOR$_3$.

Compounds of formula I are generically embraced in U.S. Pat. No. 4,111,873 as costabilizers for halogen containing polymers. The derivatives of thioglycolic acid described in the present invention are much more efficient than the 3-mercaptopropionic acid derivative described in the U.S. patent.

Costabilizers of formula II are generally novel compounds.

Preferred are those stabilized compositions wherein, in Formula I, $R^1$ and $R^2$ each represent straight-chain or branched alkyl groups of 1–20 carbon atoms or are joined together into a cycloaliphatic ring of 5–9 carbon atoms, or $R^1$ represents an optionally substituted aryl group, while $R^2$ is a straight-chain or branched alkyl group of 1–20 carbon atoms. Also preferred are those stabilized molding compositions wherein, in Formula II, $R^1$ is hydrogen and $R^2$ represents straight-chain or branched alkyl residues of 1-20 carbon atoms, $R^3$ represents straight-chain or branched alkyl groups of 4-20 carbon atoms, and $R^5$ represents straight-chain or branched alkyl groups of 1-22 carbon atoms, or $R^5$ is joined with $R^2$ into a heterocyclic ring with 5-9 ring atoms. When a heterocyclic ring is present, the hetero atom comprises oxygen.

The stabilized compositions contain, in a preferred embodiment, as the primary stabilizer(s) at least one fatty acid salt of calcium or zinc and optionally lubricants and other conventional processing aids.

In Formulas I and II, $R^1$, $R^2$, $R^3$, $R^4$ and $R^5$ can be, for example, a butyl, isobutyl, pentyl, isopentyl, hexyl, isohexyl, heptyl, isoheptyl, octyl, isooctyl, nonyl, isononyl, decyl, isodecyl, dodecyl, isododecyl, tridecyl, tetradecyl, hexadecyl, octadecyl or arachidyl group.

Furthermore, $R^1$, $R^2$ and $R^5$ can also be, for example, a methyl, ethyl, propyl or isopropyl group, and $R^5$ can also represent, for example, a behenyl residue. $R^1$ and $R^2$ can also be a propenyl, butenyl, pentenyl, hexenyl, heptenyl, octenyl, nonenyl, decenyl, dodecenyl, tetradecenyl, hexadecenyl or octadecenyl residue.

$R^1$ and $R^2$ can additionally together form, substituted or unsubstituted cycloaliphatic, e.g., cyclopentane, cyclohexane, cycloheptane, cyclooctane, cyclononane, cyclodecane, cycloundecane or cyclododecane ring, or said rings being substituted by one or more straight-chain or branched alkyl groups of 1 to 12 carbon atoms, for example, by t-butyl, n-butyl, octyl, nonyl or dodecyl groups.

Furthermore, $R^1$ and $R^2$ can also each represent an optionally substituted aryl groups, such as, for example, hydroxy, chloro, or alkyl-substituted including but not limited to phenyl, o-tolyl, m-tolyl, p-tolyl, p-tert-butylphenyl, p-nonylphenyl, p-dodecylphenyl, o-hydroxyphenyl, m-hydroxyphenyl, p-hydroxyphenyl, o-chlorophenyl, m-chlorophenyl or p-chlorophenyl group.

$R^5$ can form with $R^1$ for example, an optionally substituted tetrahydrofuran, tetrahydropyran, 4,5-benzodihydrofuran, or 5,6-benzodihydropyran ring, said rings being optionally substituted by one or more straight-chain or branched alkyl groups of 1 to 12 carbon atoms, for example, by methyl, ethyl, n-propyl, i-propyl, n-butyl, i-butyl, n-hexyl, n-octyl or 2-ethylhexyl groups.

The stabilized compositions based on polymers of vinyl chloride, according to this invention, contain, as costabilizers, derivatives of the thioglycolic acid esters masked at the mercapto group by mercaptal formation or monothioacetal formation. These co-stabilizers do not exhibit the drawback of unpleasant odor. In this connection, the observation was made that these compounds enhance, to an unforeseeable degree, the stabilizing effect of fatty acid salts of zinc and calcium. The positive influence of the mercaptals and monothioacetals of thioglycolic acid esters manifests itself in an improvement of the initial color as well as in a marked prolongation of total stability.

The polymers of vinyl chloride constituting the basis of the stabilized molding compositions of this invention involve polyvinyl chloride of copolymers of vinyl chloride, which can be produced by the conventional methods as described, for example, in the monograph by Kainer, "Polyvinylchlorid und Vinylchlorid-Mischpolymerisate" [Polyvinyl Chloride and Vinyl Chloride Copolymers] (1965), Springer publishers, pages 7-59 (bulk, suspension, or emulsion polymerization). The copolymers can contain up to about 30% by weight of comonomers, such as, for example, vinyl acetate, vinylidene chloride, vinyl ethers, acrylonitrile, acrylic acid esters, maleic acid mono- or diesters, or olefins. It is also possible to employ graft polymers, the preparation of which is disclosed, for example, in the above-mentioned Kainer monograph on pages 111-114.

The compounds of Formulas I and II can be prepared by means of the conventional methods of organic synthesis as described, for example, in Houben-Weyl, "Methoden der organischen Chemie" [Methods of Organic Chemistry] 9: 199-205 (1955). Preferably, compounds of Formula I are produced by acid-catalyzed condensation of thioglycolic acid esters with carbonyl compounds with removal of the water of reaction, and compounds of Formula II are formed, for example, by acid-catalyzed addition of thioglycolic acid esters to open-chain or cyclic enol ethers of aliphatic carbonyl compounds. Suitable carbonyl compounds for the preparation of compounds of Formula I are, for example, cyclohexanone, 4-tert-butylcyclohexanone, cyclododecanone, 4-heptanone, 2,6-dimethyl-4-heptanone, 2,6,8-trimethyl-4-nonanone, acetophenone, and propiophenone. Preferred thioglycolic acid derivatives are the butyl ester, 2-ethylhexyl ester, or 5-ethylnonyl ester. A suitable preparation method exemplified infra.

The monothioacetals described by Formula II are produced, for example, by reacting the same thioglycolic acid esters with enol ethers, such as isobutylvinyl ether, tridecylvinyl ether, hexadecylvinyl ether, octadecylvinyl ether, or cyclic enol ethers, such as, for example, dihydropyran, under acid catalysis. A suitable process is exemplified infra.

Examples of compounds corresponding to Formula I can include but are not limited to:

(1) methylenebis(thioglycolic acid butyl ester)
(2) methylenebis(thioglycolic acid 2-ethylhexyl ester)
(3) ethylidenebis(thioglycolic acid butyl ester)
(4) ethylidenebis(thioglycolic acid 2-ethylhexyl ester)
(5) isopropylidenebis(thioglycolic acid butyl ester)
(6) isopropylidenebis(thioglycolic acid 2-ethylhexyl ester)
(7) 4,4-heptylidenebis(thioglycolic acid butyl ester)
(8) 4,4-heptylidenebis(thioglycolic acid 2-ethylhexyl ester)
(9) 3,3-pentylidenebis(thioglycolic acid butyl ester)
(10) 3,3-pentylidenebis(thioglycolic acid 2-ethylhexyl ester)
(11) cyclohexylidenebis(thioglycolic acid butyl ester)
(12) cyclohexylidenebis(thioglycolic acid 2-ethylhexyl ester)
(13) cyclododecylidenebis(thioglycolic acid butyl ester)
(14) cyclododecylidenebis(thioglycolic acid 2-ethylhexyl ester)
(15) 1-phenylethylidenebis(thioglycolic acid 2-ethylhexyl ester)
(16) 1-phenylethylidenebis(thioglycolic acid butyl ester)
(17) 1-phenylpropylidenebis(thioglycolic acid butyl ester)
(18) 1-phenylpropylidenebis(thioglycolic acid 2-ethylhexyl ester)
(19) 1-(4-chlorophenyl)ethylidenebis(thioglycolic acid butyl ester)
(20) 1-(4-chlorophenyl)ethylidenebis(thioglycolic acid 2-ethylhexyl ester)
(21) methylenebis(mercaptosuccinic acid dibutyl ester)

(22) ethylidenebis(mercaptosuccinic acid dibutyl ester)
(23) isopropylidenebis(mercaptosuccinic acid dibutyl ester)
(24) 4,4-heptylidenebis(mercaptosuccinic acid dibutyl ester)
(25) 3,3-pentylidenebis(mercaptosuccinic acid dibutyl ester)
(26) cyclohexylidenebis(mercaptosuccinic acid dibutyl ester)
(27) cyclododecylidenebis(mercaptosuccinic acid dibutyl ester)
(28) 1-phenylethylidenebis(mercaptosuccinic acid dibutyl ester)
(29) 1-phenylpropylidenebis(mercaptosuccinic acid dibutyl ester)
(30) 1-(4-chlorophenyl)ethylidenebis(mercaptosuccinic acid dibutyl ester)

Compounds corresponding to Formula II can be, for example:
(1) S-(1-ethoxyethyl)thioglycolic acid butyl ester
(2) S-(1-ethoxyethyl)thioglycolic acid 2-ethylhexyl ester
(3) S-(1-ethoxyethyl)mercaptosuccinic acid dibutyl ester
(4) S-(1-isobutoxyethyl)thioglycolic acid butyl ester
(5) S-(1-isobutoxyethyl)thioglycolic acid 2-ethylhexyl ester
(6) S-(1-isobutoxyethyl)mercaptosuccinic acid dibutyl ester
(7) S-(1-isooctyloxyethyl)thioglycolic acid butyl ester
(8) S-(1-isooctyloxyethyl)thioglycolic acid 2-ethylhexyl ester
(9) S-(1-isooctyloxyethyl)mercaptosuccinic acid dibutyl ester
(10) S-(1-nonyloxyethyl)thioglycolic acid butyl ester
(11) S-(1-nonyloxyethyl)thioglycolic acid 2-ethylhexyl ester
(12) S-(1-nonyloxyethyl)mercaptosuccinic acid dibutyl ester
(13) S-(1-tridecyloxyethyl)thioglycolic acid butyl ester
(14) S-(1-tridecyloxyethyl)thioglycolic acid 2-ethylhexyl ester
(15) S-(1-tridecyloxyethyl)mercaptosuccinic acid dibutyl ester
(16) S-(1-hexadecyloxyethyl)thioglycolic acid butyl ester
(17) S-(1-hexadecyloxyethyl)thioglycolic acid 2-ethylhexyl ester
(18) S-(1-hexadecyloxyethyl)mercaptosuccinic acid dibutyl ester
(19) S-(1-octadecyloxyethyl)thioglycolic acid butyl ester
(20) S-(1-octadecyloxyethyl)thioglycolic acid 2-ethylhexyl ester
(21) S-(1-octadecyloxyethyl)mercaptosuccinic acid dibutyl ester
(22) S-(1-tetrahydropyranyl)thioglycolic acid butyl ester
(23) S-(1-tetrahydropyranyl)thioglycolic acid 2-ethylhexyl ester
(24) S-(1-tetrahydropyranyl)mercaptosuccinic acid dibutyl ester Conventional compounds can be utilized as primary stabilizers in the stabilized compositions of this invention, including but not limited to: metallic soaps, salts of aromatic carboxylic acids and/or metallic phenolates.

Preferably the costabilizers of the invention are utilized in combinations with the carboxylates of cadmium, barium, zinc and calcium. It is possible to combine the costabilizers of the invention with other primary stabilizers, such as organotin compounds inorganic or organic lead salts, or organic antimony compounds, but in those combinations the costabilizers are less efficient.

Preferably, the metallic soaps are fatty acid salts of calcium, barium or zinc, derived from fatty acids of 8–36, preferably 8–22 carbon atoms. In particular, suitable herein are caprylates, caprates, laurates, myristates, palmitates, stearates, and behenates. The salts of branched fatty acids can likewise be used, such as of 2-ethylhexanoic acid, 2-octyldecanoic acid or tetradecyloctadecanoic acid. Also, hydroxy fatty acids, such as 9(10)-hydroxystearic acid or 9,10-dihydroxystearic acid can be used. The metallic soaps can consist of the salts of individual fatty acids or also the salts of fatty acid mixtures as obtained from natural fats. Especially suitable as the salts of aromatic carboxylic acids are the calcium, barium and zinc salts of benzoic acid and of substituted benzoic acid, particularly of alkyl-substituted benzoic acid. Suitable phenolates are methylphenolates, tertbutylphenolates, nonylphenolates, dodecylphenolates, or naphthenates of calcium, barium or zinc.

Normally, the stabilized compositions contain, per 100 parts of polymer, about 0.02–2, preferably 0.05–0.5 parts by weight of compounds of Formula I or II. The primary stabilizers can be contained in amounts of about 0.05–5, preferably 0.1–2 parts by weight per 100 parts by weight of polymer. Preferably, the molding compositions of this invention contain, per 100 parts of polymer, 0.1–3 parts by weight of calcium soap and/or 0.1–3 parts by weight of barium soap and/or 0.1–3 parts by weight of zinc soap. The soaps are preferably derived from fatty acids of 8–22 carbon atoms and generally, together do not total more than 3 parts by weight in 100 parts by weight of polymer.

The stabilized compositions of this invention can be produced by customary methods, for example by simple mechanical mixing of the components in conventional mixers. During this mixing step, additional customary processing aids can be incorporated, such as, for example, lubricants (e.g., montan waxes or polyol partial esters), plasticizers, fillers, light stabilizers or further costabilizers, such as, for example, epoxidized fatty acid esters, polyols, phosphites, (preferably alkylaryl phosphites) or 1,3-diketones. The homogeneous distribution of the stabilizers in the PVC can be accomplished, for example, with the aid of a two-roll mixer at 150°–200° C.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight; unless otherwise indicated. These examples will demonstrate the unexpected results obtained by the present invention.

Preparation of the Compounds of Formula I 493.8 g (2.4 mol) of thoiglycolic acid 2-ethylhexyl ester was dissolved in 600 ml of hexane and combined with 3 g of p-toluenesulfonic acid monohydrate. Under agitation, 117.8 g (1.2 mol) of cyclohexanone was added and the mixture was heated under reflux on a water trap. After a reaction period of 12 hours, 96% of the calculated water of reaction had been separated. The solution was washed twice with respectively 200 ml of 3% strength NaHCO$_3$ solution, dried over Na$_2$SO$_4$, and concentrated. After removal of residual volatile components under vacuum (about 0.2 mbar) at 60° C., there remained 585 g (98%) of cyclohexylidenebis(thioglycolic acid 2-ethylhexyl ester) as a clear, pale-yellow oil.

The process can be applied, under identical conditions, to the condensation of other ketones and other thioglycolic acid ester.

Preparation of the Compounds of Formula II 277 g (0.93 mol) of octadecylvinyl ether was dissolved in 700 ml of diethyl ether and combined, at 0° C., with a solution of 185 g (0.9 mol) of thioglycolic acid 2-ethylhexyl ester and 0.5 g of p-toluenesulfonic acid monohydrate in 250 ml of diethyl ether. The clear reaction mixture was allowed to stand at room temperature for two days, then washed with 200 ml of 3% NaHCO$_3$ solution and twice with respectively 200 ml of water, and concentrated. After removal of residues of volatile compounds under vacuum (0.4 mbar) at 90° C., there remained 450 g (98%) of S-(1-octadecyloxyethyl)thioglycolic acid 2-ethylhexyl ester as a clear, colorless oil.

The same process can be applied, under identical conditions, to the addition of other thioglycolic acid esters to other vinyl ethers.

Production and Testing of Rolled Sheets

The effect of the stabilizer combinations was tested by determining static thermostability of rolled sheets. For this purpose, the stabilizer combinations and optionally plasticizers and processing aid were mixed with polyvinyl chloride for one minute in a laboratory mill and then processed on a two-roll milling unit at a roll temperature of 170° C. in synchronized passes during the course of 5 minutes into 1 mm thick rolled sheets. Strips having the dimensions 10×250 mm were cut from the rolled sheets and subsequently placed under thermal load in a special furnace ("Metrastat" type Sigma) at 180° C. The test strips, in this procedure, are continuously removed from the heating zone and show the effect of the stabilizers by color change.

A mixture A was composed from the following ingredients (pw=parts by weight):
100 pw suspension polyvinyl chloride (K value 70; "VESTOLIT " S 7054; Huls AG, Marl)
30 pw dioctyl phthalate
0.3 pw montan wax
0.5 pw zinc stearate
1.0 pw calcium stearate
("suspension polyvinyl chloride" is not a suspension of PVC in a medium, but it is a PVC powder, prepared by polymerization of vinyl chloride in a water suspension. 100 parts by weight of this powder are 100 wt-% polyvinyl chloride).

In order to produce the polyvinyl chloride molding compositions B–E according to this invention, mixture A, having the above-indicated composition, was supplemented by the following additives:
in B: 0.2 pw cyclohexylidenebis(thioglycolic acid 2-ethylhexyl ester)
in C: 0.2 pw 1-phenylethylidenebis(thioglycolic acid 2-ethylhexyl ester)
in D: 0.2 pw S-(1-isobutoxyethyl)thioglycolic acid 2-ethylhexyl ester
in E: 0.2 pw S-(1-octadecyloxyethyl)thioglycolic acid 2-ethylhexyl ester
in F: 0.2 pw 4,4-heptylidenebis(thioglycolic acid butyl ester)
in G: 0.2 pw cyclododecylidenebis(thioglycolic acid 2-ethylhexyl ester)
in H: 0.2 pw S-(1-octadecyloxyethyl)mercaptosuccinic acid dihexyl ester
in I: 0.2 pw mercaptosuccinic acid dihexyl ester
in J: 0.2 pw thioglycolic acid 2-ethylhexyl ester
in K: 0.2 pw S-(2-Methoxy-2-propyl)thioglycolic acid 2-ethylhexyl ester The mixtures B–K were processed into test strips as set forth above.

The table indicates the times (in minutes) at which there occurred the initial discoloration of the strips at 180° C., and breakdown of stability (black coloration).

|  | A | B | C | D | E | F | G | H | I | J | K |
|---|---|---|---|---|---|---|---|---|---|---|---|
| Initial Discoloration | 23 | 35 | 40 | 42 | 40 | 50 | 38 | 42 | 40 | 37 | 55 |
| Stability Breakdown | 38 | 48 | 46 | 52 | 53 | 57 | 52 | 47 | 47 | 46 | 60 |

Because of their high thermal stability, the composition of this invention are particularly useful as molding compositions wherein temperatures of at least 140° C. are encountered. Compositions comprising the costabilizer and polymer, without the primary stabilizer are useful and unobvious compositions, if only as starting compositions to be blended with the primary stabilizer. Likewise compositions comprising the stabilizer and costabilizer are useful and unobvious stabilizing compositions, per se.

The preceding examples can be repeated with similar success by substituting the generically or specifically described reactants and/or operating conditions of this invention for those used in the preceding examples.

Throughout this disclosure the use of the costabilizers of this invention have been associated with compositions based on polymers of vinyl chloride. However, the compounds of Formula I and II can be used as costabilizers in any composition which is susceptible to thermal degradation by the process of dehydrochlorination. Thus, the compounds of the invention can be used as costabilizers in any composition having a polymer containing the repeating unit

wherein R$^7$ and R$^8$, being identical or different, preferably represent hydrogen or chlorine. Furthermore, other halogenated thermoplastic polymers, e.g., those containing bromine, are susceptible to thermal degradation by the process of hydrogen and halogen elimination. Therefore, the compounds of the present invention can also be used as costabilizers in compositions having a polymer containing the repeating unit

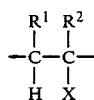

wherein X represents chlorine or bromine and $R^1$ and $R^2$, being identical or different, preferably represent hydrogen, chlorine or bromine.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A stabilized composition comprising a polymer of predominantly vinyl chloride and a stabilizer being a compound of the formula

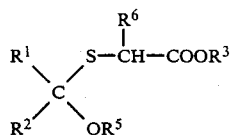

wherein $R^1$ and $R^2$, being identical or different, represent hydrogen, straight-chain or branched alkyl or alkenyl groups of 1–20 carbon atoms, aryl groups or substituted aryl groups, or together form a cycloaliphatic ring of 5–12 carbon atoms, or either $R^1$ or $R^2$, jointly with $R^5$, is part of a heterocyclic ring with 5–9 ring atoms, $R^3$ represents a straight-chain or branched alkyl group of 4–20 carbon atoms, and $R^5$ stands for a straight-chain or branched alkyl group of 1–22 carbon atoms or, jointly with $R^1$ or $R^2$, is part of a heterocyclic ring with 5–9 ring atoms, while $R^6$ represents a hydrogen atom or a grouping —CH$_2$—COOR$_3$.

2. A stabilized composition comprising:

(a) a polymer containing at least one unit of

wherein $R^7$ and $R^8$, being identical or different, represent hydrogen, chlorine, or bromine, or X represents chlorine or bromine;

(b) a stabilizer being a compound of the formula

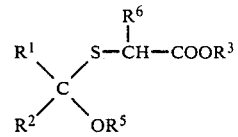

wherein $R^1$ and $R^2$, being identical or different, represent hydrogen, straight-chain or branched alkyl or alkenyl groups of 1–20 carbon atoms, aryl groups or substituted aryl groups, or together form a cycloaliphatic ring of 5–12 carbon atoms, or either $R^1$ or $R^2$, jointly with $R^5$, is part of a heterocyclic ring with 5–9 ring atoms, $R^3$ represents a straight-chain or branched alkyl group of 4–20 carbon atoms, and $R^5$ stands for a straight-chain or branched alkyl group of 1–22 carbon atoms or, jointly with $R^1$ or $R^2$, is part of a heterocyclic ring with 5–9 ring atoms, while $R^6$ represents a hydrogen atom or a grouping —CH$_2$—COOR$_3$.

3. A stabilized composition according to claim 2, wherein $R^7$ and $R^8$, being identical or different, represent hydrogen or chlorine and X is chlorine.

4. A stabilized molding composition according to claim 1, wherein in the formula, $R_1$ is hydrogen and $R^2$ represents straight-chain or branched alkyl residues of 1–20 carbon atoms, $R^3$ represents straight-chain or branched alkyl groups of 4–20 carbon atoms, and $R^5$ represents straight-chain or branched alkyl groups of 1–22 carbon atoms, or that $R^5$ is joined with $R^2$ into a heterocyclic ring with 5–9 ring atoms.

5. A stabilized composition according to claim 1, wherein said composition contains about 0.02 to 2 parts by weight of said stabilizer per 100 parts by weight polymer.

6. A stabilized composition according to claim 5, wherein said composition contains 0.05 to 0.5 parts by weight of said stabilizer per 100 parts by weight polymer.

7. A stabilized composition according to claim 1, wherein the stabilizer is S-(1-isobutoxyethyl)thioglycolic acid 2-ethylhexyl ester.

8. A stabilized molding composition according to claim 2, wherein in the formula, $R_1$ is hydrogen and $R^2$ represents straight-chain or branched alkyl residues of 1–20 carbon atoms, $R^3$ represents straight-chain or branched alkyl groups of 4–20 carbon atoms, and $R^5$ represents straight-chain or branched alkyl groups of 1–22 carbon atoms, or that $R^5$ is joined with $R^2$ into a heterocyclic ring with 5–9 ring atoms.

9. A stabilized composition according to claim 2, wherein said composition contains about 0.02 to 2 parts by weight of said stabilizer per 100 parts by weight polymer.

10. A stabilized composition according to claim 9, wherein said composition contains 0.05 to 0.5 parts by weight of said stabilizer per 100 parts by weight polymer.

11. A stabilized composition according to claim 2, wherein the stabilizer is S-(1-isobutoxyethyl)thioglycolic acid 2-ethylhexyl ester.

* * * * *